3,033,760
PROCESS FOR THE MANUFACTURE OF NEW ANTIBIOTICS

Ernst Gaeumann, Zurich, Hans Bickel, Binningen, and Ernst Vischer, Basel, Switzerland, assignors to Ciba Pharmaceutical Products Inc., Summit, N.J.
No Drawing. Filed July 13, 1959, Ser. No. 826,431
Claims priority, application Switzerland July 17, 1958
3 Claims. (Cl. 195—80)

In U.S. patent application Serial No. 749,616, and now abandoned, filed July 21, 1958, by Vladimir Prelog et al., there is described a new water-soluble antibiotic, referred to as A–9578, which is obtained by the culture of the strain of Actinomyces called *Streptomyces griseoflavus* A–9578, or of its mutants. The designation A–9578 of the strain corresponds to NRRL 2717.

It has now been found that the same antibiotic, which we now call pilosomycin, and its constituents are also obtained when a strain of *Streptomyces galilaeus* n. sp. NRRL 2722 is cultivated.

*Streptomyces galileaus* n. sp. NRRL 2722 belongs to a new species of the genus Streptomyces which is not identical with any of the species enumerated in Bergey's "Manual of Determinative Bacteriology," 7th edition (1957).

This organism exhibits the following characteristics. The spores are smooth. The air mycelium is ash-grey. The spore chains form open regular spirals. They are monopodially branched and have a long straight main axis. When the organism is cultivated on nutrient substrata containing peptone, a melanoid coloration takes places. Growth is relatively little dependent on temperature and the mould develops well both at 18° C. and at 40° C., but the optimum growth is between 25° C. and 32° C.

For the purpose of further characterization, the growth of *Streptomyces galilaeus* n. sp. NRRL 2722 on various nutrient media is described below. The nutrient media 1–7 and 10 were prepared as described by W. Lindenbein, Arch. Mikrobiol., vol. 17, page 361 (1952).

(1) Synthetic agar: Growth in the form of specks, light yellowish-red. Air mycelium lacking. Substratum slightly pale carmine.

(2) Synthetic solution: Fine clouding, substratum light yellowish-red.

(3) Glucose-agar: Growth pustular, light yellow to pale carmine. Air mycelium powdery to velvety, ash-grey.

(4) Glucose-asparagin-agar: Growth sparse, pustular, light yellow to light yellowish-red. Air mycelium powdery, snow white.

(5) Calcium mallate-agar: Growth pustular, reddish-brown to copper red.

(6) Gelatine stab culture (18° C.): Flocculent base growth, light yellow. Substratum discolored faintly dark brown. Liquefaction after 30 days amounts to 0.5 cm.

(7) Starch plate: Growth pustular, carmine red. Hydrolysis after 3 days amounts to 0.2 cm., after 7 days 0.5 cm.

(8) Potatoes: Growth sparse, in the form of specks, light yellowish-red.

(9) Carrots: No growth.

(10) Litmus milk: Growth as pustular pellicle, greenish grey to light brown. No peptonization and partial coagulation. Litmus blue or bleached.

According to the system of Ettlinger et al., Arch. Mikrobiol. (in the press), *Streptomyces galilaeus* n. sp. shows certain resemblances to *Streptomyces hygroscopicus* (Jensen) Waksman and Henrici, *Streptomyces aureofaciens* Duggar and *Streptomyces parvulus* Waksman and Gregory, which likewise have smooth spores, an ash-grey air mycelium and spore chains in spirals. All three varieties, however, differ from *Streptomyces galilaeus* in that they do not exhibit any brown-black melanoid coloration of nutrient substrata containing peptone. Furthermore, *Streptomyces hydroscopicus* differs in its closed spirals, *Streptomyces aureofaciens* in its open, irregular spirals and, finally, *Streptomyces parvulus* in the short straight main axis of the spore chains.

According to Waksman's system in Bergey's Manual, 7th edition, *Streptomyces galileaus* n. sp. is closest to the following species: *Streptomyces californicus*, *Streptomyces bobiliae*, *Streptomyces aurantiacus*, *Streptomyces erythraeus* and *Streptomyces novaecaesareae*. These differ from *Streptomyces galilaeus* above all in the following respects.

*Streptomyces californicus:* Does not form any soluble pigment on gelatine; growth on synthetic agar is wine red, no soluble pigment; peptonization of litmus milk; growth on potatoes red-brown.

*Streptomyces bobiliae:* Rapid liquefaction of gelatine; growth on synthetic agar coral red to dark red; no coagulation of litmus milk, but peptonization.

*Streptomyces aurantiacus:* Slight peptonization, but no coagulation of litmus milk; soluble brown pigment on potatoes.

*Streptomyces erythraeus:* Growth on synthetic agar white to light yellow; colonies on starch-agar cream-colored with greenish tinge; growth on glucose-agar cream to brown; peptonization of litmus milk; growth on potato light yellow.

*Streptomyces novaecaesareae:* Growth on synthetic agar grey to bluish, wrinkled, air mycelium white; growth on potato cream-colored to yellowish, wrinkled; surface growth on gelatine, no colonies, peptonization of litmus milk.

Investigated by the method employed by T. G. Pridham and D. Gottlieb, J. Bacteriology, vol. 56, p. 107 (1948), *Streptomyces galilaeus* n. sp. NRRL 2722 shows good growth when the following sources of carbon are used: L-xylose, L-arabinose, L-rhamnose, saccharose, raffinose, inulin, D-mannitol, D-sorbitol, mesoinositol, salicin, D-fructose.

As regards the manufacture of the antibiotic pilosomycin, the present invention is not limited to the use of Sterptomyces galilaeus n. sp. NRRL 2722 or of other strains corresponding to the description, but also relates to the use of variants of these organisms such as are obtained, for example, by selection or mutation, in particular under the action of ultra-violet rays or X-rays or nitrogen mustard oils.

In order to produce the antibiotic pilosomycin, a strain of streptomycetes corresponding to the above description is aerobically cultivated in an aqueous nutrient solution containing a source of carbon and nitrogen and, if required, growth-promoting substances, until the solution exhibits a substantial antibacterial action, and the antibiotic pilosomycin is thereupon isolated.

As a source of carbon there may be used, for example, assimilable carbohydrates, such as glucose, saccharose, lactose, mannitol, starch and glycerine. As nitrogenous nutrients and, if desired, growth-promoting substances there may be mentioned amino-acids, peptides and proteins, and also their degradation products, such as peptone or tryptone, and also meat extracts, water-soluble constituents of cereal grains, such as maize and wheat, of distillation radicals in the manufacture of alcohol, of yeast, beans, especially of soya bean plants, of seeds, for example of cotton plants, etc., and also ammonium salts and nitrates. Among other inorganic salts the nutrient solution may contain, for example, chlorides carbonates or sulfates of alkali metals, alkaline earth metals, magnesium, iron, zinc or manganese.

The cultivation is carried out aerobically, for example in a quiescent surface culture or advantageously immersed while being agitated or stirred with air or oxygen in a shaking bottle or a known fermenter. A suitable temperature is one between 18° C. and 40° C. The nutrient solution generally exhibits a substantial antibacterial action after 1½ to 5 days.

In order to isolate the antibiotic pilosomycin, the following methods may, for example, be used: The mycelium is separated from the culture filtrate, whereupon the bulk of the antibiotic is found in the culture filtrate. However, appreciable amounts of the antibiotic nevertheless remain adsorbed on the mycelium. It is therefore advantageous to wash the mycelium well. Water and aqueous organic solvents, such as alcohols, for example aqueous methanol, are suitable for this purpose.

Various methods are suitable for recovering the antibiotic from the culture filtrate and purifying it and may be used singly or in combination with one another. It has been found to be advantageous to maintain the culture solution at a pH between 3 and 5 during these operations.

The methods possible are as follows:

(1) Adsorption agents may be used, for example active carbons, such as Norit, activated earths, such as fuller's earth or floridin, or resin adsorbers, such as Asmit. The adsorbates are advantageously eluted by means of mixtures of organic solvents miscible with water and water or aqueous acids, for example, by means of water-methanol, water-pyridine, dilute acetic acid-methanol or water-methanol-glacial acetic acid-butanol mixtures. A mixture of water (2 parts by volume), methanol (1 part by volume), glacial acetic acid (1 part by volume) and butanol (2 parts by volume) has been found to be particularly advantageous for the elution of a Norit adsorbate.

(2) A second method of separating the antibiotic from the culture filtrate consists in that the antibiotic is adsorbed on cation exchangers, resins containing acid groups, such as Amberlite IRC–50, being especially suitable. The latter may be employed both in the acid form and in the sodium form, but a mixture of these two forms in the volumetric ratio 1:2 has proved to be especially suitable. The elution is advantageously carried out by means of dilute acids, for example by means of methanolic hydrochloric acid.

(3) Moreover, the basic antibiotic can also be precipitated directly from the culture filtrate, for example by reaction with an organic acid of the type of picnic acid. By treating these precipitates with salts of organic bases, for example with triethylammonium sulfate, or with dilute acids, the antibiotic is obtained in the form of the corresponding salt. It is possible to operate both in an aqueous medium and in a solvent miscible with water, such as methanol or acetone. This conversion of the difficultly soluble salts into easily soluble salts of the antibiotic is carried out either using mineral acids or on ion-exchanger resins, for example Amberlite IRA–400.

(4) Enrichment of the antibiotic is also obtained by adding to aqueous or aqueous-alcoholic solutions of the salt an excess of organic solvents miscible with water, such as acetone, dioxane, etc., the salts being precipitated in solid form.

(5) Another method of enriching the antibiotic consists in that aqueous solutions thereof are extracted with solutions of phenol in chloroform, both the pH of the aqueous solution and the phenol content of the chloroform solution being varied. Thus, for example, in the case of distribution between a solution containing 100 grams of phenol to 100 cc. of chloroform and an aqueous phase having a pH of 1 to 6, the antibiotic is containing almost exclusively in the organic phase, while then a solution is used which contains only 33 grams of phenol to 100 cc. of chloroform it is extracted almost completely from the aqueous phase only at a pH between 4 and 6. If there is understood by the distribution coefficient of the antibiotic the ratio of concentration in the organic phase to the concentration in the aqueous phase, it is apparent from the above details that the distribution coefficient increases as the phenol content of the organic phase rises and decreases as the pH of the aqueous phase falls. As it is thus possible to adjust any desired distribution coefficient of the antibiotic in this system, it is possible to separate a large proportion of inactive impurities by combination of a small number of distribution operations.

(6) Another method of enriching the antibiotic is constituted by chromatography, such as adsorption chromatography on various materials, for example Norit, aluminum oxide, magnesium silicates, silica gel, calcium sulfate, and also distribution chromatography using cellulose, starch, silica gel, Celite and the like as carrier substances, or chromatography on ion-exchanger resins, for example Dowex 50, Amberlite IRC–50 and the like. For example, distribution chromatography on cellulose using the solvent system butanol (4 parts by volume), glacial acetic acid (1 part by volume) and water (5 parts by volume) has proved to be particularly satisfactory.

(7) Moreover, the antibiotic can be enriched by countercurrent distribution as described by Craig between two immiscible solvent phases. The following solvent systems have proved to be especially suitable:

(a) Secondary butanol—1/10 N ammonium acetate buffer having a pH value of 4.68.

(b) 1/10 N ammonium acetate buffer having a pH value of 4.6–10% solution of phenol in chloroform. The distribution coefficient of the antibiotic in system (b) and thus the location of the maximum activity in the distributed material can be varied as desired on the one hand by altering the pH of the buffer solution and on the other hand by varying the phenol content of the organic phase.

The following combination of the enrichment methods enumerated has proved suitable for producing a substantially pure preparation. The antibiotic is adsorbed from the culture filtrate on the buffered ion-exchanger Amberlite IRC–50 and is eluted by means of methanolic hydrochloric acid. The eluate is concentrated in vacuo at a pH value of 5, an aqueous concentrate of the antibiotic being obtained which corresponds in volume to about 1/100 of the culture solution. This concentrate is distributed a number of times by method 5 mentioned above between phenol-chloroform mixtures on the one hand and aqueous solutions of varying pH value on the other hand, there being obtained after freeze drying a preparation which, in relation to the culture filtrate, has a specific activity which is increased by the factor 500–1000. By treating such a preparation by the above-mentioned method 6 (distribution chromatography on cellulose) and method 7, the basic and substantially homogeneous antibiotic pilosomycin can be obtained, preferably in the form of a salt.

As is apparent from paper chromatography tests, the antibiotic pilosomycin consists of at least two constituents, namely the main constituent A and the secondary constituent B. In the course of the enrichment process described, these are separated from one another to an appreciable extent, especially in the case of distribution chromatography on cellulose and in the case of countercurrent distribution.

The two constituents of pilosomycin are defined by paper chromatography by a direct comparison of their $R_f$ values with the $R_f$ values of a number of known antibiotics (2–11) in the systems A–G. In the case of the system H, the chromatography is continuous. The figures for the system H given in the table are the paths of the antibiotics measured in centimeters, after a 16-hour chromatogram period. Detection of the antibiotics is effected autobiographically with *Staphylococcus aureus* or *Bacillus subtilis*.

| System | 1a | 1b | 2 | 3 | 4 | 5 | 6 | 7 | 8 | 9 | 10 | 11 |
|---|---|---|---|---|---|---|---|---|---|---|---|---|
| A | 0 | 0 | 0 | 0 | 0 | 0 | 0 | 0 | 0 | 0.92 | 0.07 | 0 |
| B | 0.49 | 0.63 | 0.05 | 0.05 | 0.17 | 0.02 | 0.02 | 0.66 | 0.55 | 0.92 | 0.32 | 0.22 |
| C | 0.34 | 0.58 | 0.22 | 0 | 0.02 | 0.22 | 0.03 | 0.72 | 0.62 | 0.93 | 0.39 | 0.11 |
| D | 0.05 | 0.15 | 0 | 0 | 0 | 0 | 0 | $x$ | $x$ | 0.92 | | 0 |
| E | 0.32 | 0.32 | 0 | 0.10 | 0.22 | 0 | 0 | $x$ | $x$ | 0.86 | | 0.12 |
| F | 0.47 | 0.47 | 0.22 | 0.14 | 0.12 | 0.04 | 0.05 | 0.49 | 0.42 | 0.91 | 0.43 | 0.36 |
| G | 0.74 | 0.74 | 0.07 | | | 0.02 | | $x$ | $x$ | 0.94 | 0.61 | 0.69 |
| H | 2.7 | 7.6 | 0 | 0 | 0 | 0 | 0 | (14.5) | (8.8) | 27 | | 1 |

A=butanol saturated with water.
B=butanol-glacial acetic acid-water (4:1:5) (upper phase).
C=butanol saturated with water+2% of para-toluene sulfonic acid.
D=butanol saturated with water+2% of piperidine.
E=butanol-pyridine-water (6:4:3).
F=80% ethanol+1.5% sodium chloride, Whatman No. 4 impregnated with 0.95-m. sodium sulfate+0.05-m. sodium hydrosulfate.
G=butanol-ethanol-water (1:1:2).
H=butanol-butyl acetate-glacial acetic acid-water (10:3:1.3:14.3) (upper phase).
(1a) Pilosomycin base A.
(1b) Pilosomycin base B.
(2) Streptomycin.
(3) Ristocetin A.
(4) Ristocetin B.
(5) Neomycin B.
(6) Viomycin.
(7) Chlortetracyclin.
(8) Oxytetracyclin.
(9) Acetinomycin J.
(10) Cycloserin.
(11) Grisein.
($x$) Antibiotic distributed over entire path.
( ) Position poorly defined.

In paper electrophoresis in 0.1-molar acetate buffer having a pH value of 4.6, the antibiotic pilosomycin migrates towards the cathode. The migration velocity is about half as high as that of streptomycin.

Constituent A of the antibiotic pilosomycin is an orange-yellow powder which dissolves easily in water, well in methanol and difficultly in most organic solvents.

Base A gives the following color reactions: $FeCl_3$: brown-red; $FeCl_3K_3Fe(CN)_6$: blue; ninhydrin: faintly violet. The Sackaguchi, Maltol and Ehrlich-Morgan tests are negative. In addition to carbon, hydrogen, nitrogen and oxygen, the substance contains iron. An aqueous solution of constituent A shows adsorption maxima in the ultra-violet spectrum at 215 m$\mu$ $$(E_{1cm.}^{1\%} = 312)$$

and at 315 m$\mu$ $$(E_{1cm.}^{1\%} = 42)$$

The free base of the antibiotic pilosomycin is easily accessible from its salts, from the sulfate, for example, by reaction in an aqueous medium with barium hydroxide, neutralization of the excess baryta with carbon dioxide and separation of the barium carbonate and sulfate precipitate and isolation of the free base by means of freeze drying. Preparation from the salts is carried out more simply by using a strongly basic anion exchanger, for example the OH form of the product on the market under the name of Dowex-2.

One of the most striking properties of the antibiotic pilosomycin is a marked minimum stability between the pH values of 7 and 11. At a temperature of 20° C. and with a pH value of 8–10, solutions of the antibiotic lose their activity in the course of 48 hours, whereas at the same temperature and at pH values of 1–5 they remain fully active, and at pH values of 6–7 or greater than 11 partially active.

The salts of the antibiotic pilosomycin and of its constituent are derived from the known inorganic and organic salts, for example of hydrochloric acid, the sulfuric acids and phosphoric acids, succinic acid, citric acid, mandelic acid, glutamic acid or pantothenic acid. They are neutral or acid salts. They are prepared by the action of the corresponding acids on the free base or by double decomposition of salts, for example pilosomycin sulfate, with calcium pantothenate.

The antibiotic pilosomycin has a very high antibiotic activity against various test organisms. In the so-called agar transevrse streak test, it is active against the following test organisms: *Micrococcus pyogenes*, var. *aureus*, *Streptococcus viridans*, *Streptococcus faecalis*, *Corynebacterium diphteriae*, *Escherichia coli*, *Bacillus megatherium* and *Bacillus subtilis*.

The antibiotic pilosomycin and its components A and B are also active in vivo. When mice infected with *Staphylococcus pyogenes*, var. *aureus*, with Pneumococcus Type III or with *Sterptococcus haemolyticus* were given five subcutaneous injections of 1 mg. of component A per kilogram of body weight 80% to 100% of survivals were observed, and when a dosage of 5 injections of 0.1 mg. per kilogram of body weight was administered 60% of survivals were observed. In the case of oral administration the same effect is obtained with 10 times higher doses. Component B has the same high antibiotic activity in vivo towards Pneumococcus Type III.

The toxicity of the antibiotic and its components A and B is slight. Thus, for example, the subcutaneous application of 500 milligrams per kilogram of body weight is tolerated by mice without any harm.

The antibiotic pilosomycin, its constituents, its salts or its derivatives may be employed as medicaments, for example in the form of pharmaceutical preparations. These preparations contain the said compounds in admixture with a pharmaceutical organic or inorganic carrier suitable for enteral, parenteral or local administration. For making the carrier there are used substances which do not react with the new compounds, such as, for example, gelatine, lactose, starch, magnesium stearate, talc, vegetable oils, benzyl alcohols, gums, polyalkylene glycols, white petroleum jelly, cholesterol or other known carriers for medicaments. The pharmaceutical preparations may be in the form, for example, of tablets, dragees, powders, salves, creams, suppositories or in liquid form as solutions, suspensions or emulsions. If desired, they are sterilized and/or contain auxiliary substances, such as preserving, stabilizing, wetting or emulsifying agents. They may also contain other therapeutically valuable substances.

The invention is illustrated in the following examples, but no limitation of the object of the invention is thereby intended. The temperatures are given in degrees centigrade.

*Example 1*

The cultivation of *Streptomyces galilaeus* n. sp. NRRL. 2722 is carried out by the immersion method. A nutrient solution is used which contains 20 grams of soya bean meal and 20 grams of mannitol per liter of tap water. The nutrient solution is sterilized in an inoculation flask or in a fermenter for 20–30 minutes under 1 atmosphere gauge pressure. The sterilized nutrient solution has a pH value of 7.5 to 8.0. The inoculation is carried out with up to 10% of a partially sporulating vegetable culture of the organism. Incubation is carried out while shaking or stirring well at 27° C., cultures in fermenters being aerated with about 2 volumes of sterile air per column of solution per minute. After 48–120 hours of incubation, the culture solution has attained the highest checking value towards the test organisms (*B. subtilis, B. megatherium, Micrococcus pyogenes*, var. *aureus*). The cultivation is interrupted, the pH value is brought to 4.5 by adding dilute sulfuric acid and the mycelium and other solid constituents are separated by filtration or centrifuging from the solution containing the bulk of the antibiotic, about 1% of a filtration assistant, for example Hyflo Supercel, being added to the culture solution before filtration, if desired. The filtration residue is washed with water and aqueous methanol and the washings are combined with the culture filtrate.

If nutrient solutions containing the following nutrient substances per liter of tap water are used instead of the above-mentioned nutrient solution, culture filtrates having a similarly high antibiotic activity are obtained after cultivation and working up in an analogous manner.

|   |   | Grams |
|---|---|---|
| (a) | Glucose | 10 |
|   | Soya bean meal | 10 |
|   | Sodium chloride | 5 |
|   | Sodium nitrate | 1 |
| (b) | Glycerine | 20 |
|   | Soya bean meal | 10 |
|   | Sodium chloride | 5 |
|   | Sodium nitrate | 1 |
|   | Calcium carbonate | 10 |
| (c) | Glucose | 10 |
|   | Soya bean meal | 10 |
|   | Corn steep liquor | 20 |
|   | Sodium chloride | 5 |
|   | Sodium nitrate | 1 |
|   | Calcium carbonate | 10 |
| (d) | Lactose | 20 |
|   | Distillers solubles | 20 |
|   | Sodium chloride | 5 |
|   | Sodium nitrate | 1 |

*Example 2*

3 liters of a culture filtrate obtained as described in Example 1 are brought to a pH value of 7.5 by adding dilute caustic soda solution and 50 grams of active carbon (Norit A) are added thereto. The mixture is stirred mechanically for 1 hour, the entire antibiotically active substance being adsorbed by the carbon. The latter is separated by filtration, advantageously with the addition of a little filter assistant, such as, for instance, Hyflo Supercel, from the completely inactive solution. The carbon is thereupon introduced into 500 cc. of a mixture of 4 parts by volume of water and 1 part by volume of pyridine and the mixture is stirred mechanically for half an hour and then filtered, whereupon the carbon residue is extracted once more in the same manner. The eluates contain the entire antibiotic activity.

*Example 3*

3 liters of a culture filtrate obtained as described in Example 1 are brought to a pH value of 7.5 by adding dilute caustic soda solution and then immediately conveyed at a rate of flow of 0.5 liter per hour to a column of Amberlite IRC–50 (H form), the length and diameter of which are 30 cm. and 5 cm., respectively. The antibiotic is completely adsorbed. The column is washed with 3 liters of water. 1 liter of 0.4-n hydrochloric acid is used for elution. The first 500 cc. of the eluate are antibiotically inactive, while the second 500 cc. contain the entire activity. This active eluate is made to percolate through a column of Amberlite IR–4B to remove the excess hydrochloric acid. By freeze drying of the percolate, the enriched antibiotic pilosomycin is obtained in the form of a highly active amorphous powder.

*Example 4*

6 liters of a culture filtrate obtained as described in Example 1 are brought to a pH value of 7.5 by adding dilute caustic soda solution and then immediately made to percolate through a column of Asmit 173 which is 14 centimeters long and has a diameter of 4.5 centimeters. The antibiotic is completely adsorbed. The adsorber resin is thereupon washed with 5 liters of water and the antibiotic is eluted with 1 liter of a mixture of methanol and 1-n acetic acid (1:1). The eluate, which contains the entire activity, is concentrated in vacuo at a temperature of 35° C. to 15 cc. To this solution are added 75 cc. of 0.25-n methanolic hydrochloric acid and the mixture is poured into 10 liters of acetone, the hydrochloride of the antibiotic being precipitated. This is filtered and washed with acetone. For further purification, the hydrochloride is dissolved in 150 cc. of methanol and the somewhat turbid solution is filtered with the addition of Celite. After the filtrate has been evaporated in vacuo at a temperature of 25° C., the hydrochloride of the antibiotic pilosomycin is obtained in the form of an amorphous powder.

*Example 5*

30 liters of a culture filtrate obtained as described in Example 1 are brought to a pH value of 4.5 and then concentrated in a thin-layer evaporator to 2 liters. The concentrate is brought to a pH value of 8 by adding dilute caustic soda solution and is filtered with the addition of Celite. The clear filtrate is brought to a pH value of 5 and 1.5 liters of hot aqueous picric acid solution of 5% strength are added thereto while stirring. The precipitate produced is filtered off with the addition of 50 grams of Celite after standing for several hours at 0° C. The filtrate is only very slightly antibiotically active. The filtration residue is thereupon thoroughly stirred three times with 800 cc. of cold acetone each time and filtered. The filtrate is concentrated in vacuo to 80 cc., the picrate of the antibiotic and excess picric acid being precipitated. After separation, 8.5 grams of dry substance are obtained.

In order to isolate the antibiotic as hydrochloride, 2.5 grams of the said dry substance are dissolved in 30 cc. of methanol. Thereafter, a mixture of 1 cc. of concentrated hydrochloric acid and 10 cc. of acetone is first added and then 500 cc. of ether, the hydrochloride being precipitated quantitatively. By repeatedly dissolving the precipitate in methanol containing hydrochloric acid and precipitation with ether, the last traces of picric acid can be removed therefrom. Finally, the hydrochloride is dissolved in as little methanol as possible, filtered and evaporated in vacuo. 714 milligrams of the hydrochloride of the antibiotic pilosomycin, which is very active antibiotically, are obtained.

*Example 6*

600 liters of a culture filtrate obtained as described in Example 1 are stirred with 5.5 kilograms of Hyflo Supercel, adjusted to a pH value of 4.0 with 2.5 liters of 2-n hydrochloric acid and then filtered. The filtration residue is washed with 100 liters of water. The clear filtrate is stirred with 7 kilograms of pretreated Norit for 45 minutes. The pretreatment of the Norit is carried out by stirring thoroughly several times with 1-n hydrochloric acid and subsequent neutral washing with water. The Norit charged with antibiotic is filtered off. The filtrate does not contain any antibiotic activity. The Norit adsorbate is washed twice with 200 liters of water by stirring and filterng. The washing liquid does not contain any activity. Elution is carried out by stirring the active carbon thoroughly twice for 1 hour with a mixture of n-butanol-methanol-glacial acetic acid-water in the volumetric ratio 2:1:1:2, the active carbon being separated off by filtration. The combined eluates (140 liters+46 liters) are thoroughly mixed with 96 liters of n-butyl acetate. The aqueous phase which separates is removed and the organic phase is washed with 1.2 liters of water. The combined aqueous phases (65.5 liters) are washed by stirring thoroughly in succession with 72 liters of a mixture of n-butanol-n-butyl acetate in the volumetric ratio of 1:2, 48 liters of acetic ester and finally 24 liters of ether. The organic phases are abandoned. The aqueous phase remaining (44 liters), which contains the entire antibiotic activity, is concentrated in a Quickfitt evaporator to a volume of 5.45 liters at a temperature of not more than 30° C. The antibiotic is obtained from this highly active, brown-black concentrate by freeze drying in the form of 509 grams of brown powder. In relation to the culture filtrate, this material has 30 to 50 times the specific antibiotic activity.

*Example 7*

In order to isolate the antibiotic pilosomycin from 300 liters of a culture filtrate obtained as described in Example 1, 1 part by volume of Amberlite IRC–50 in the H form is mixed mechanically with 2 parts by volume of Amberlite IRC–50 in the Na form. 6.3 liters of this mixture are charged into a glass column. The height: diameter ratio of the resin bed is 8:1. The culture filtrate is adjusted to a pH value of 4.0 with 2-n hydrochloric acid and made to percolate through the resin at a rate of flow of 0.2 liter per minute per liter of resin, an orange brown zone being formed in the upper two thirds of the column. The resin is then washed with 30 liters of water and 60 liters of methanol of 80% strength. The liquid flowing through and the washings contain only a little antibiotic activity. The elution is effected into portions with a total of 37 liters of a mixture of 8 parts by volume of methanol and 2 parts by volume of 1-n hydrochloric acid. Both portions are adjusted to a pH value of 5.0 with 5-n NaOH, combined and then concentrated to 2 liters in a circulation evaporator at a temperature of not more than 30° C. The aqueous concentrate is adjusted to a pH value of 5.6 and filtered through Hyflo Supercel for the purpose of removing slightly insoluble material. This filtrate (2.3 liters) contains approximately the entire antibiotic activity of the culture solution. It is extracted in 4 portions with a total of 500 ml. of a phenol-chloroform mixture containing 100 grams of phenol in 100 ml. of chloroform. The aqueous phase is abandoned. The phenol-chloroform extract (500 ml.) is diluted with 1 liter of chloroform and shaken three times with 500 ml. of 1/10-n ammonium acetate buffer having a pH value of 4.60, colored antibiotically inactive impurities being removed from the organic phase. The chloroform phase is now extracted with 300 ml.+2×100 ml. of 1/10-n hydrochloric acid. The deep red acid extract, which contains the antibiotic, is brought to a pH value of 3.5 with potassium bicarbonate and extracted back with four 50 ml. portions of phenol-chloroform mixture (100 grams: 100 ml.). The phenol-chloroform extract is filtered through Celite. To the clear red-colored filtrate (200 ml.) there are added, while shaking strongly, 50 ml. of water, 500 ml. of ether and 300 ml. of petroleum ether. After separation of the aqueous phase, the organic phase is washed twice with 50 ml. of water. The combined aqueous extracts are shaken twice with 500 ml. of ether and once with 500 ml. of benzene and then lyophilized. 2.60 grams of an orange brown powder which is highly active antibiotically are obtained. This material exhibits in relation to the starting material 500–1000 times the specific antibiotic activity (activity per unit of weight of dry substance). On Whatman No. 1 paper, this material shows two substance stains in the system n-butanol: n-butyl acetate:glacial acetic acid:water=10:3:1.3:14.3 after bioautographical development with *Staphylococcus aureus*. The more slowly migrating antibiotic substance is designated as base A and the substance migrating 2.5 times as fast as base B. Base A gives a blue color reaction on the paper when sprayed with

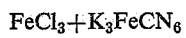

$$FeCl_3 + K_3FeCN_6$$

*Example 8*

338 grams of an antibiotic preparation obtained as described in Example 6 are dissolved in 1.5 liters of water. 150 grams of crystalline ammonium sulfate are added and the solution is extracted with one portion of 1 liter and two portions of 500 ml. of a phenol-chloroform mixture containing 100 grams of phenol in 100 ml. of chloroform. The combined phenol-chloroform extracts are shaken with 750 ml. of 1-n hydrochloric acid and then filtered through a layer of Celite. 600 ml. of water, 4 liters of ether and finally 4 liters of petroleum ether are added while stirring to the clear red-brown filtrate. The aqueous phase is separated and the organic phase is extracted with two 200 ml. portions of water. The combined aqueous phases (1 liter) are washed twice with 1 liter of ether and then lyophilized. 136 grams of a brown powder are obtained which, in relation to the starting material, exhibits a specific antibiotic activity increased by the factor 2.

*Example 9*

550 milligrams of a strongly active antibiotic preparation obtained as described in Example 11 (base A) are dissolved in 55 ml. of a 1/10-n ammonium acetate buffer having a pH value of 4.60 and extracted with four 20 ml. portions of a phenol-chloroform mixture containing 100 grams of phenol in 400 ml. of chloroform. The organic extracts are washed back with two 15 ml. portions of buffer solution. The organic extract (80 ml.) containing the antibiotic is diluted with 40 ml. of chloroform, washed once more with 60 ml. of buffer solution and then filtered through a double folded filter. The deep red filtrate is extracted with 30+20+10 ml. of 0.2-n hydrochloric acid. The acid solution containing the antibiotic is diluted with 50 ml. of water and exhaustively extracted with a phenol-chloroform mixture containing 100 grams of phenol in 100 ml. of chloroform (2×20 ml.+10 ml.). The combined phenol-chloroform extracts are filtered through a double folded filter and shaken with 20 ml. of water, 200 ml. of ether and 100 ml. of petroleum ether. After separation of the aqueous phase, the organic phase is extracted with two 15 ml. portions of water. The combined aqueous extracts are washed twice with 50 ml. of ether and once with 50 ml. of benzene and then lyophilized. 117 milligrams of a brown-red powder are obtained which exhibits approximately a fivefold enrichment of the antibiotic activity in relation to the starting material.

*Example 10*

700 milligrams of an antibiotic preparation obtained as described in Example 7 are chromatographed on 127 grams of Whatman No. 1 cellulose powder. The upper phase of a mixture of 4 parts of butanol, 1 part of glacial acetic acid and 5 parts of water is used as elution medium. To the separated upper phase there is added 10 percent by volume of pure butanol. The substance is ground with 10 times the quantity of cellulose powder and applied to the column as powder. The rate of flow is 15–20 ml. per hour. Fractions amounting to 40 ml. are collected. The individual fractions are shaken with 50 ml. of petroleum ether. The separated aqueous phase is washed with benzene and lyophilized. The bulk of the antibiotic activity is in fractions 7 and 8 (121 milligrams) and 10–13 (142 milligrams). According to paper chromatography tests, fractions 7 and 8 predominantly contain base B, while fractions 10–13 predominantly contain base A.

*Example 11*

3 grams of an antibiotic preparation obtained as described in Example 8 are distributed over 100 stages in a Craig distribution apparatus in the system secondary butanol-0.1-n ammonium acetate buffer with a pH value of 4.68. Each unit contains 100 ml. of upper and 100 ml. of lower phase. The substance is charged into unit No. 3. Working up is carried out by reacting the mixture of the two phases with twice the volume of petroleum ether and lyophilization of the aqueous phase. The dark-colored fractions 3–11 contain only a little antibiotic activity. The organge yellow fractions 12–20 (631 milligrams) contain the major part of the antibiotic activity (predominantly base A). The yellow-colored fractions 21–40 are less active and contain a mixture of bases A and B in which the latter predominates.

*Example 12*

200 milligrams of an antibiotic preparation obtained as described in Example 10 (base A) are distributed over 29 stages in a Craig distribution apparatus in the system 1/20-n ammonium acetate buffer with a pH value of 4.58–10% phenol in chloroform. Each stage contains 10 ml. of upper and 10 ml. of lower phase. The bulk of the antibiotic activity is in fractions 6–15. These are combined (about 200 ml.), 400 ml. of ether and 300 ml. of petroleum ether are added and the mixture is shaken. The separated orange red aqueous phase is washed with chloroform and extracted with one portion of 20 ml. and three portions of 10 ml. of a mixture of 100 grams of phenol in 100 ml. of chloroform. 20 ml. of water, 300 ml. of ether and 200 ml. of petroleum ether are added to the phenol-chloroform extract while agitating. The red-colored aqueous phase is separated, washed with large quantities of ether and benzene and lyophilized. 86.4 milligrams of base A in the form of a yellow water-soluble powder are obtained. Ultra-violet spectrum in water:

$\lambda_{max.}$: 215 m$\mu$ ($E_{1cm.}^{1\%}=312$), 315 m$\mu$ ($E_{1cm.}^{1\%}=42$)

Color reactions: $FeCl_3$: brown-red; $FeCl_3 + K_3Fe(CN)_6$: blue; ninhydrin: faintly positive. Negative: Sakaguchi, Maltol, Elson-Morgan.

The substance contains iron in addition to carbon, hydrogen, oxygen and nitrogen.

What is claimed is:

1. A method for producing the antibiotic pilosomycin, which comprises cultivating a Streptomyces strain of the species selected from the group consisting *S. galilaeus* n. sp. NRRL 2722 and mutants thereof in an aqueous nutrient medium containing a source of carbon and of nitrogen and inorganic salts under aerobic conditions at 18–40° C. until the nutrient medium exhibits a substantial antibiotic activity and then isolating the antibiotic pilosomycin from the culture filtrate.

2. A method for producing the antibiotic pilosomycin, according to claim 1 which comprises cultivating a Streptomyces strain of the species selected from the group consisting *S. galilaeus* n. sp. NRRL 2722 and mutants thereof in an aqueous nutrient medium containing a source of carbon and of nitrogen and inorganic salts under aerobic conditions at 18–40° C. until the nutrient medium exhibits a substantial antibiotic activity, isolating the antibiotic pilosomycin from the culture filtrate, and forming an acid addition salt thereof.

3. A method for producing the antibiotic pilosomycin, according to claim 1 which comprises cultivating a Streptomyces strain of the species selected from the group consisting *S. galilaeus* n. sp. NRRL 2722 and mutants thereof in an aqueous nutrient medium containing a source of carbon and of nitrogen and inorganic salts under aerobic conditions at 18–40° C. until the nurtient medium exhibits a substantial antibiotic activity, isolating the antibiotic pilosomycin from the culture filtrate, and separating the antibiotic into its components.

References Cited in the file of this patent

Sakawazake: J. of Antibiotics, April 1955, Ser. A, pp. 39–41.
Waga et al.: J. of Antibiotics, 1953, Ser. A., pp. 62–72.
Hata et al.: J. of Antibiotics, Ser. A, July 1956, pp. 144–146.
J. of Antibiotics, vol. 8, No. 6, 1955, p. 257.